Figure 1:
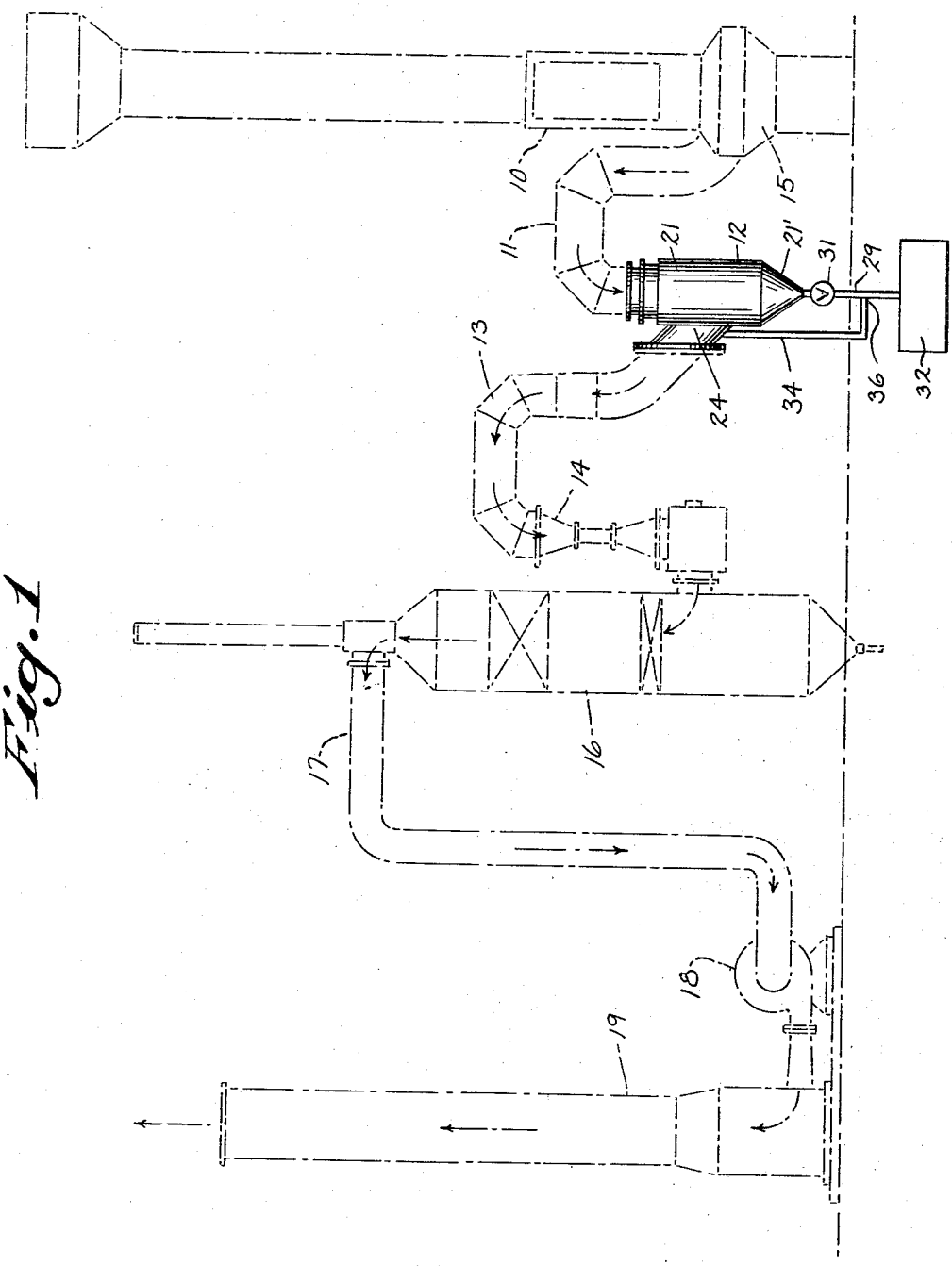

INVENTORS
DAVID E. DELL'AGNESE
TOWNSEND TINKER

BY
Morell & Morell
ATTORNEYS

United States Patent Office 3,331,591
Patented July 18, 1967

3,331,591
CUPOLA EXHAUST GAS CONDITIONING SYSTEMS
David E. Dell'Agnese, Port Washington, Wis., and Townsend Tinker, Easton, Md., assignors to Modern Equipment Company, Port Washington, Wis., a corporation of Wisconsin
Filed Oct. 23, 1965, Ser. No. 503,591
1 Claim. (Cl. 261—65)

This invention relates to improvements in cupola exhaust gas conditioning systems, and more particularly to a novel combination gas quencher and hydraulic safety valve for use in such systems.

In the operation of metal melting cupolas it is required by law in most communities that the gases generated within the cupola be cooled and cleansed before they are discharged to the atmosphere, and for this purpose most cupolas have associated therewith an intricate quenching and scrubbing system designed to completely recondition said exhaust gases before discharging the same. Said exhaust gases are extremely hot as they are withdrawn from the cupola, reaching temperatures of 2000° F. or higher, and in order to control the flow of said hot gases through the conditioning apparatus it has heretofore been necessary to employ water-cooled valves. Unfortunately, such water-cooled valves are not only relatively expensive, but they are not always reliable. The effectiveness and efficiency of said valves is particularly important if a failure should develop in some part of the conditioning system, in which event it is necessary to block the flow of exhaust gas from the cupola in order to prevent a hazardous accumulation of explosive gas in the system. Such failures are not unusual, and dangerous explosions have resulted because of the unsatisfactory performance of said conventional water-cooled valves.

With the above considerations in mind, the principal object of the present invention is to provide a novel gas quenching apparatus for cooling and cleansing cupola exhaust gases which also functions as a hydraulic isolation seal or valve to effectively prevent the flow of cupola exhaust gas into the conditioning system in the event of an unsafe operating condition, thereby eliminating the necessity for expensive and unreliable water-cooled valves of the type heretofore employed.

Further objects of the present invention are to provide a novel combination gas quencher and positive hydraulic shut-off valve for the purposes described which is relatively simple in design and operation, which is durable in construction, and which improved apparatus is otherwise particularly well adapted for its intended purposes.

With the above and other objects in view, which other objects and advantages will become apparent hereinafter, the invention comprises the improved combination gas quencher and hydraulic seal apparatus described in the following specification and also any and all modifications or variations thereof as may come within the spirit of said invention, and within the scope of the appended claim.

Figure 2:
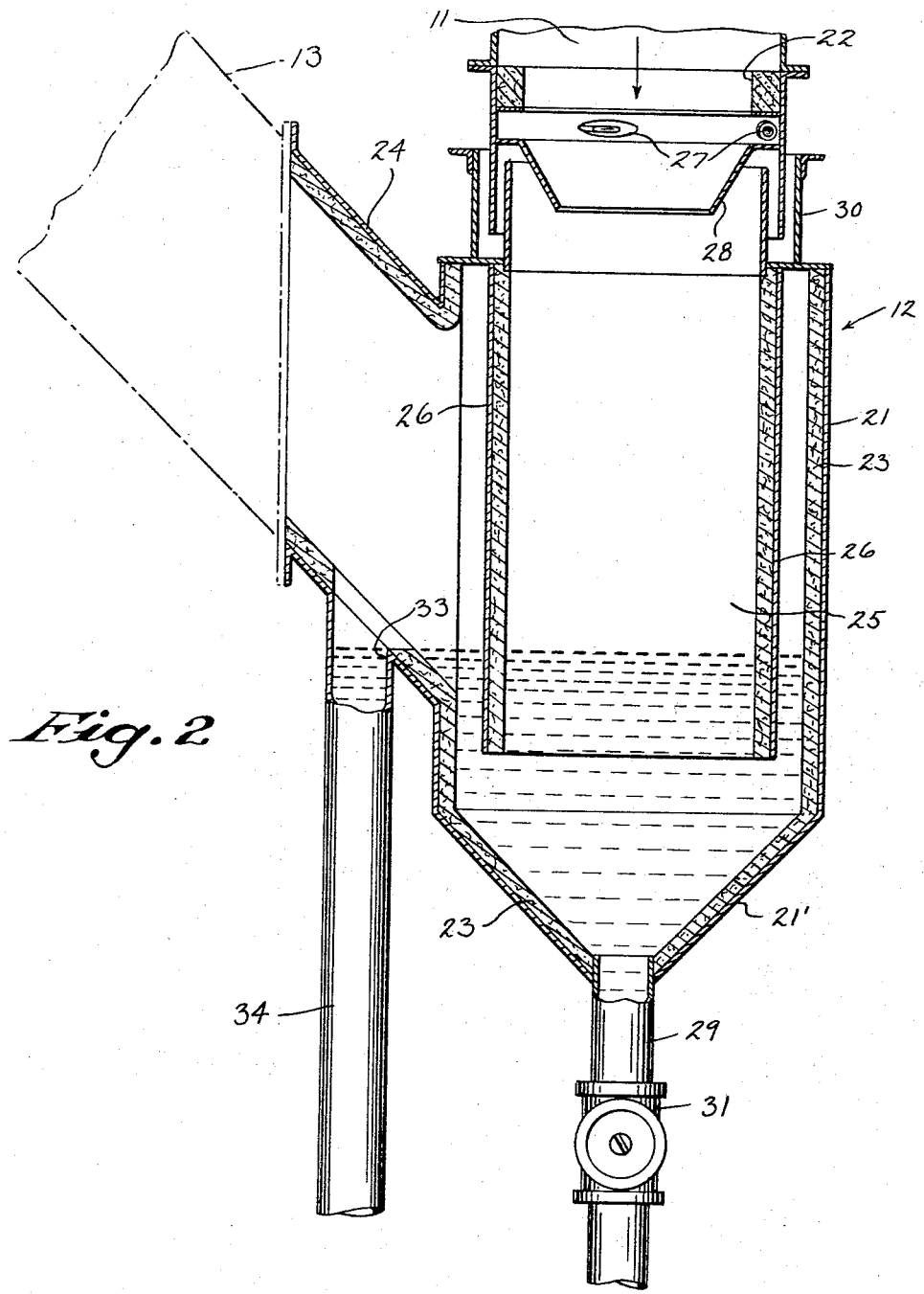

In the accompanying drawings, wherein there is illustrated one preferred embodiment of the invention, and wherein the same parts are designated by the same reference numerals in both of the views:

FIG. 1 is a schematic view showing, in dot and dash lines, a cupola and associated gas conditioning system and showing the novel quencher and hydraulic seal apparatus in full lines; and FIG. 2 is an enlarged veritcal sectional view of the combination quencher and hydraulic seal.

Referring now more particularly to FIG. 1 of the drawings, the numeral 10 designates a conventional metal melting cupola and the numeral 11 indicates a conduit connected to the cupola gas take-off bustle 15 and designed to convey the gases generated within said cupola into the conditioning system, there being suitable fan means in said system for drawing said gases therethrough. In conventional cupola gas conditioning systems one or more expensive water-cooled valves are ordinarily mounted in said conduit 11 and are intended to be operable to close said conduit in the event of a breakdown or failure somewhere in the system. As hereinabove mentioned, however, such water-cooled valves are not completely reliable, and one of the principal objects of the present invention is to provide a novel hydraulic seal or valve which eliminates the necessity for said conventional water-cooled valves.

From the cupola 10 the gas take-off conduit 11 leads to the novel combination quencher and hydraulic seal apparatus comprising the present invention, which is designated generally by the numeral 12, and where the hot exhaust gases are quenched and cooled as will be hereinafter described. From said quenching unit 12 the gases are directed through a pipe 13 and venturi unit 14 into a scrubber and separator device 16. The latter device is designed to thoroughly cleanse the cooled gases before they are directed through a conduit 17 and blower 18, and discharged through a stack 19 to the atmosphere. The design and operation of said scrubber and blower members is well known in the art and will not, therefore, be described in detail herein.

With reference now to FIG. 2 of the drawing, illustrating the improved quenching and seal apparatus comprising the present invention, it will be seen that said apparatus includes a cylindrical body or housing 21 having a top opening 22 communicating with the exhaust gas conduit 11 leading from the cupola, there being a suitable expansion joint assembly 30 incorporated in the upper end of said housing. Said cylindrical housing 21 is preferably formed of steel and is provided with a suitable refractory lining 23, and communicating with and extending upwardly and outwardly from a point intermediate the height of said housing is a gas take-off duct 24 which is coupled to the conduit 13 leading to the scrubber and other elements of the conditioning system.

In the illustrated form of the invention a concentric, cylindrical wall or skirt 26 is mounted within the upper portion of said housing 21 and extends downwardly a substantial distance therein to form a cylindrical quenching chamber 25 having an open lower end through which the cooled gases flow. Said quenching chamber is designed to promote and facilitate the quenching operation but said chamber is not critical to the operation of the apparatus inasmuch as the quenching operation could be performed within the housing 21 without said special inner chamber, and the invention is not to be limited to use in a structure identical to that illustrated.

Formed in and adjacent the upper end of the housing 21 are a plurality of annularly-spaced water inlet nozzles 27 communicating with pipes (not shown) leading from a suitable water source and pump, and an annular deflector or baffle 28 is mounted immediately below said water nozzles, the function of which will be described. The lower end portion of said quencher housing 21 is tapered downwardly, as indicated at 21', and communicates with a water drain pipe 29 leading to a water reservoir 32 (FIG. 1). Mounted within said drain pipe is a conventional shut-off valve 31 which need not be water-cooled since it is not contacted by the hot exhaust gases, as will be hereinafter seen.

Formed in the underside of the gas take-off duct 24 is an overflow opening 33 which is positioned above the open lower end of the quenching chamber 25, and communicating with said overflow opening is a pipe 34 which extends downwardly and is connected to the water drain pipe 29 at a point 36 (FIG. 1) below the valve 31.

In the use of the novel combination quencher and hydraulic safety seal apparatus comprising the present invention, the hot exhaust gases drawn off from the cupola 10 (FIG. 1) are directed through the conduit 11 and into the upper end of the quencher 12. Simultaneously, water is pumped into the upper portion of the quencher housing 21 through the inlets 27 and is deflected downwardly and inwardly therein by the annular baffle 28 to intercept said downwardly flowing gases. As said exhaust gases enter the top of the quencher housing they are at an extremely high temperature, which makes it impractical to use conventional valves and equipment, but after being intercepted by and subjected to said water quench the temperature level of said gases is quickly reduced. During normal operation of the conditioning system the water introduced into the top of the quenching chamber 25 falls downwardly through the open bottom thereof and through the tapered lower end 21' of the housing into the drain pipe 29, the valve 31 in said drain pipe being open to permit the continuous evacuation of said water. After being subjected to said water quench the cooled exhaust gases flow through the open lower end of said quenching chamber 25 and are drawn outwardly through the take-off duct 24, said gases then being directed through the attached conduit 13 into the scrubber 16 and other components of the conditioning system before being discharged through the stack 19, as described.

In accordance with the present invention, in the event of a breakdown or failure somewhere in the gas conditioning system the flow of gas from the cupola can be quickly stopped in order to prevent a dangerous explosive gas buildup in the system. To accomplish this, the operator has merely to shut off the valve 31 in the quencher drain pipe 29. When said valve 31 is closed the water which is continuously introduced at the upper end of the housing through the inlets 27 accumulates in the bottom of said housing, and quickly rises therein. When the level of the rising water ascends above the lower end of the quenching chamber 25 the cupola gas flowing downwardly in said chamber is prevented from escaping through the bottom thereof, and out the take-off duct 24, thus providing a positive hydraulic seal which ensures that additional gas from the cupola will not be drawn into the system, where it could create a hazardous situation.

After the level of the water reaches the overflow opening 33 it will spill through said opening and flow downwardly through the pipe 34, which bypasses the valve 31 (FIG. 1), and be directed back into the reservoir 32, thereby preventing said water level from rising higher than is required to provide a hydraulic seal to close off the bottom of said quenching chamber 25.

When the trouble in the conditioning system has been located and repaired the valve 31 may again be opened to allow the water accumulated in the housing 22 to drain through the discharge pipe 29 and the quencher will again operate in its normal manner, with the quenching spray being continuously evacuated through said pipe 29. The result is that with the present invention a water spray is not only employed to quench the incoming cupola exhaust gases, but said quenching water can also be utilized to close the lower end of the quenching chamber and to thereby form a positive hydraulic shut-off valve adapted to prevent the introduction of said gases into the conditioning system in the event of unsafe operating conditions.

As mentioned, the exact design of the quencher housing 21 is not critical to the present invention, and said housing structure can be varied considerably without departing from the intended scope of the invention. It is contemplated, for example, that the inner quenching chamber 25 could be eliminated, and in that event the overflow opening 33 must be located above the gas take-off duct 24 to permit the water to rise thereabove when it is desired to seal the system. Moreover, while the valve 31 is described as being manually actuated, it is possible to incorporate automatic operating means, and the invention is not to be limited in this respect.

From the foregoing detailed description it will be seen that the present invention provides a novel combination gas quencher and hydraulic seal apparatus that eliminates the necessity for employing expensive and unreliable water-cooled valves of the type heretofore utilized in cupola gas conditioning systems, thereby not only reducing the cost of the system but also promoting safety. In addition, the present apparatus is simple in design and construction, it is durable, and it is completely reliable in operation.

As hereinabove emphasized, it is to be understood that the present invention is not to be limited or confined to an apparatus identical in all respects to that illustrated and described. It is contemplated that numerous variations or modifications therein will occur to those skilled in the art, and it is intended to include herein not only the illustrated structure but also any and all modified forms thereof as may come within the spirit of said invention, and within the scope of the following claim.

What we claim is:

In a cupola exhaust gas conditioning system, a combination gas quencher and hydraulic safety valve, comprising: a vertically-mounted, substantially cylindrical housing having a top opening adapted to receive exhaust gases drawn into the system from the cupola, said housing having a downwardly-tapered lower end; a drain pipe communicating with and depending from the lower end of said housing; a gas take-off duct communicating with said housing and projecting upwardly and outwardly at an angle from the side thereof, said duct having an overflow opening therein; an overflow pipe extending downwardly from said overflow opening; means forming a concentric, cylindrical quenching chamber in said housing, said chamber having a top opening adapted to receive exhaust gases introduced into the upper end of said housing, and said cylindrical chamber having an open lower end portion extending below said overflow opening; a plurality of annularly-spaced water inlet nozzles in the upper portion of said housing and connected to a source of water, said nozzles being adapted to direct a spray of water into said chamber to quench hot exhaust gases flowing therethrough, said quenched gases ordinarily flowing out the open bottom of said chamber and out through said take-off duct; and said water ordinarily being continuously evacuated through said drain pipe during the quenching operation; and a shut-off valve in said drain pipe adapted to be closed in the event of an unsafe operating condition in the system, the closing of said valve causing the quenching water continuously introduced into said housing to rise therein to a level where said water covers and seals off the open bottom of said quenching chamber and prevents the further flow of gases through said chamber and into the system, said overflow opening preventing the water level from rising thereabove.

References Cited

UNITED STATES PATENTS

| | | |
|---|---|---|
| 2,484,277 | 10/1949 | Fisher. |
| 2,696,275 | 12/1954 | Pring. |
| 2,721,065 | 10/1955 | Ingram _____ 55—256 X |
| 2,964,304 | 12/1960 | Rice. |
| 3,041,059 | 6/1962 | Powell. |
| 3,113,168 | 12/1963 | Kinney. |

HARRY B. THORNTON, *Primary Examiner.*

T. R. MILES, *Assistant Examiner.*